Figure 1:
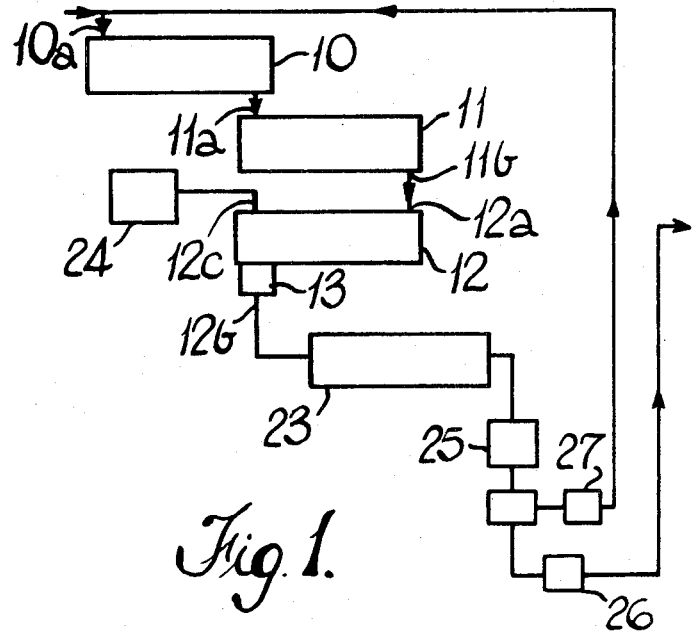

United States Patent

[11] 3,634,106

[72] Inventors: Terrence John Organ; Leslie Alderman, both of Bristol; Arthur Melley, Birmingham; William Henry Pratt-Johnson, Bromsgrove, all of England
[21] Appl. No.: 845,252
[22] Filed: July 28, 1969
[45] Patented: Jan. 11, 1972
[73] Assignee: Cadbury Brothers Limited, Bournville, Birmingham, England
[32] Priority: July 24, 1968
[33] Great Britain
[31] 35,284/68

[54] METHOD OF, AND MEANS FOR MANUFACTURING CHOCOLATE
3 Claims, 2 Drawing Figs.

[52] U.S. Cl. ............................................. 99/236 CC
[51] Int. Cl. .............................................. A23g 1/10
[50] Field of Search ............................... 99/236 CC, 23, 26; 259/18–19, 48–51

[56] References Cited
UNITED STATES PATENTS

| | | | |
|---|---|---|---|
| 2,589,801 | 3/1952 | Grindrod | 99/236 CC X |
| 2,711,964 | 6/1955 | Wiemer | 99/236 CC |
| 2,784,095 | 3/1957 | Meagher et al. | 99/236 CC X |
| 2,889,225 | 6/1959 | Palik | 99/236 CC |
| 3,506,461 | 4/1970 | Noschinski et al. | 99/236 C |

Primary Examiner—Billy J. Wilhite
Assistant Examiner—Arthur O. Henderson
Attorney—Holman & Stern ABSTRACT: A method of manufacturing chocolate comprising feeding the mixed and ground ingredients to a chamber wherein work is performed upon the mixture by rotating helically extending paddles which serve also to progress the mixture from one end of the chamber towards the other, continuously feeding the mixture from the said other end of the chamber to at least one further chamber, containing rotating paddles, for further mixing and liquifying the mixture, continuously mixing lecithin and/or cocoa butter with the mixture leaving the further chamber and returning a proportion of the end product to the first mentioned chamber.

METHOD OF, AND MEANS FOR MANUFACTURING CHOCOLATE

This invention relates to a method of, and means for manufacturing chocolate.

In the manufacture of chocolate, cocoa liquor, sugar and cocoa butter for dark chocolate, or cocoa liquid, sugar milk solids and cocoa butter for milk chocolate, are mixed together and ground, if necessary, to the required fineness. The resultant product is a flake which has to be liquified by mixing with or without the addition of extra cocoa butter. Subsequently the mixed and ground basic ingredients are passed to what is termed a conche wherein what is termed a conching operation is performed upon the mixture.

A traditional form of conche consists of a reciprocable roller moving in a trought of chocolate, normally for periods of 1 to 168 hours depending upon the quality of the chocolate required. Such conching is a time and labor consuming batch operation and the objection of the present invention is to provide in a convenient manner a method and means for performing a continuous conching operation upon the chocolate.

The action of the conche is not fully understood but the effects of the conching operation include the following:

a. Increased liquification of the chocolate.
b. Development of a desired flavor.

The development of this flavor is presumably connected with localized heat treatment of the chocolate due to the work being performed upon it. This development of flavor certainly cannot be achieved merely by holding the chocolate temperature at a given level.

c. Aeration which removes harsh volatiles particularly in the case of dark chocolate, and
d. An increased smoothness in texture, detectable by the palate rather than measurable by particle size, and attributed to removal of sharp corners from sugar crystals.

A method of manufacturing chocolate according to the invention comprises feeding the mixed and ground ingredients to a chamber wherein work is performed upon the mixture by rotating helically extending paddles which serve also to progress the mixture from one end of the chamber towards the other, continuously feeding the mixture from said other end of the chamber to at least one further chamber containing rotating paddles for further mixing and liquifying the mixture, continuously mixing lecithin and/or cocoa butter with the mixture leaving said further chamber and returning a proportion of the end product to the first mentioned chamber.

Means according to the invention for manufacturing chocolate comprises at least two chambers, the first chamber having an inlet at one end for the admission of the premixed and ground chocolate ingredients, and an outlet at the other end connected to the inlet end of the second chamber, there being disposed within the first chamber a pair of parallel and longitudinally extending rotatable shafts on which are mounted a plurality of helical paddles arranged to work upon the mixture within the first chamber and to progress it from said one end to said other end, the second chamber also incorporating a longitudinally extending shaft provided with helical paddles for progressing mixture within the second chamber from the inlet end to an outlet at the opposite end thereof, a relatively high-speed continuous mixing machine for receiving the mixture from said chambers, means for feeding lecithin and/or cocoa butter to the mixture entering said machine, and means for returning a proportion of the mixture leaving said vessel to the first mentioned chamber.

The invention may also reside in means according to the previous paragraph in which the paddles are not all of similar helix angle and the shafts in the first chamber are arranged to rotate in opposite directions to impart a tumbling and cutting action to the mixture therein.

Figure 2:
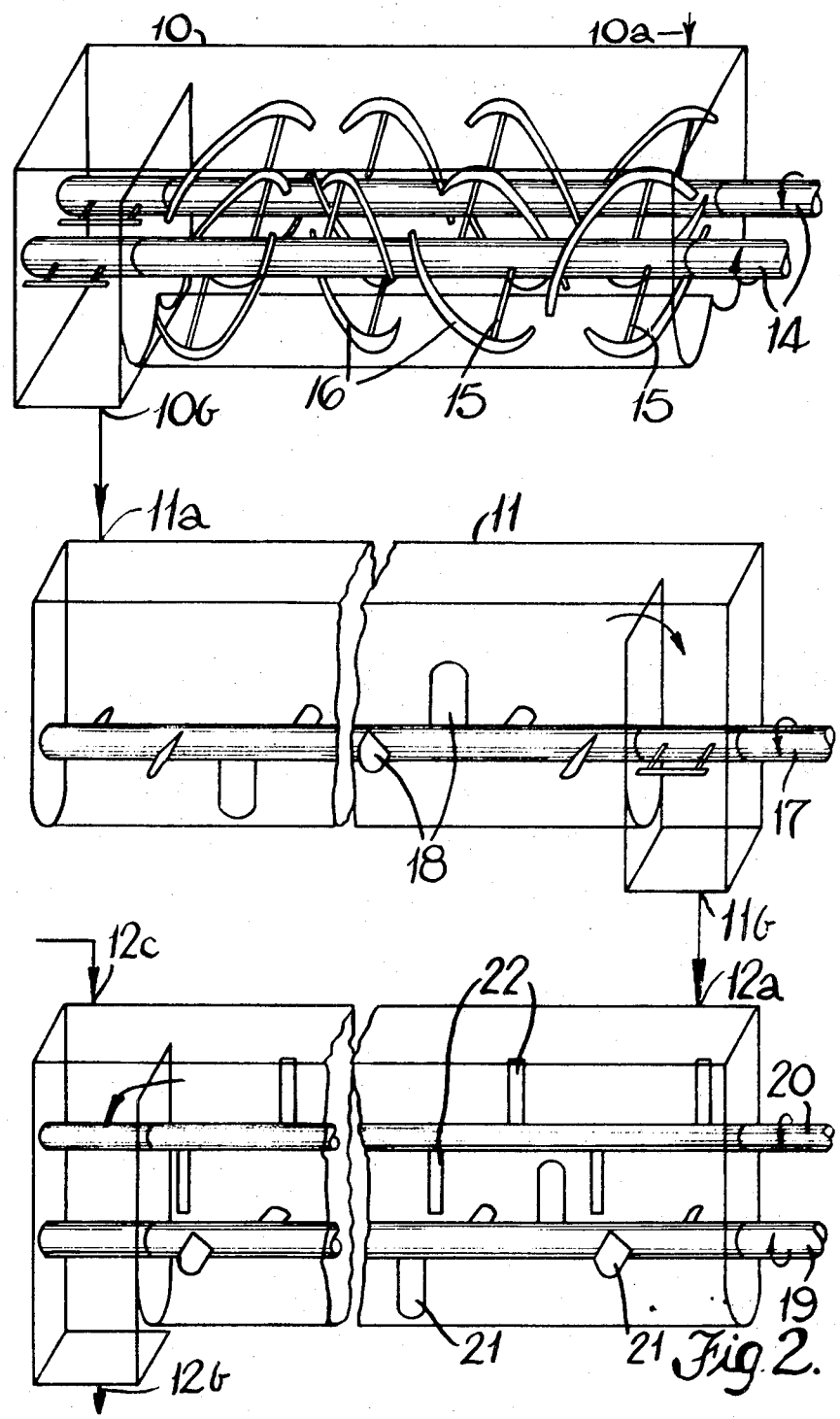

An example of the invention will now be described with reference to the accompanying drawings, in which FIG. 1 is a flow diagram of the apparatus and
FIG. 2 is a diagrammatic perspective view of the three chambers.

Referring to the drawings there are provided three chambers, 10, 11, 12 disposed one above the other. THe uppermost chamber 10 has an inlet 10a at one end to which the premixed and ground chocolate ingredients are fed, and an outlet 10b at the other end which is connected to an inlet 11a at one end of the intermediate chamber 11. At the opposite end of the intermediate chamber is an outlet 11b which is connected to an inlet 12a at one end of the lowermost chamber, which has an outlet 12b at the opposite end incorporating a pump 13.

Within the uppermost chamber 10 are a pair of parallel shafts 14 which are arranged to be driven from a common source in opposite directions. On the pair of shafts respectively are a plurality of radially extending arms 15 which carry a plurality of paddles 16 which extend helically relative to the shafts. Each shaft 14 carries a plurality of paddles 16 which extend helically in one direction and a plurality of paddle which extend helically in the opposite direction. Moreover, the plurality of paddles 16 extending in both directions are so arranged that they do not lie upon a uniform helix so that in use a considerable tumbling and cutting action is imparted to the chocolate mixture while it is in the chamber 10. However, the arrangement of the paddles 16 is such that the chocolate mixture is progressed slowly and continuously from the inlet 10a to the outlet 10b, and heat is imparted to the chocolate mixture due to the work being done upon it by the action of the paddles 16.

The intermediate chamber 11 incorporates a longitudinally extending rotatable shaft 17 on which are mounted a plurality of helically arranged paddles 18. The paddles 18 are arranged to progress the mixture from the inlet 11a to which the chocolate mixture is fed from the chamber 10 to the outlet 11a, but are arranged to do less work upon the chocolate mixture during its time within this chamber.

The lowermost chamber 12 also incorporates two longitudinally extending shafts 19, 20 arranged to be driven in opposite directions from a common source. The shaft 19 carries a plurality of helically disposed paddles 21 a minority of which are disposed at opposite inclinations so that the overall effect of these paddles will be to progress the chocolate mixture from the inlet 12a to the outlet 12b. The other shaft 20 carries radial arms 22 which are disposed adjacent to the paddles 21 and are arranged to cut the chocolate mixture from the paddles 21 and effect a thorough mixing of the mixture.

The chambers 11 and 12 may be surrounded by water jackets (not shown) whereby these chambers can be maintained at predetermined temperatures.

The chocolate mixture leaving the outlet 12b is fed by the pump 13 to a mixing vessel 23 of known kind, wherein mixing is effected at a relatively high speed as compared with the mixing in the chambers 10, 11, 12. As the chocolate mixture leaves the outlet 12b, lecithin up to 0.5 percent and/or cocoa butter is added to the mixture from an additives container 24, this addition conveniently being effected through an additional inlet 12c to the outlet end of the chamber 12. The mixture leaving the mixing vessel 23, after passing through a sieve 25, is divided into a main stream which is fed by a pump 26 to a storage tank, and a subsidiary stream which is fed by a pump 27 back to the inlet 10a for recirculation. This recirculation of the treated and liquified mixture permits the viscosity of the mixture entering the chamber 10 to be controlled without the addition of excessive/lecithin or other viscosity reducing agent to the chamber 10.

It is important that the mixing in the vessel 23 should have a high rate of shear if maximum viscosity reduction is to be achieved from a given amount of lecithin. Slow stirring during the addition of the lecithin will not achieve the same effect.

It will be appreciated that use of a continuous conching operation as described will avoid the necessity to treat individual batches to separate conching operations and thereby render the manufacture of chocolate more economical, without in any way having a deleterious effect upon the flavor or texture of the resulting chocolate. Moreover, the control of hygiene during manufacture is rendered easier.

Having thus described our invention what we claim as new and desire to secure by Letters Patent is:

1. Means for manufacturing chocolate comprising at least two chambers, the first chamber having an inlet at one end for the admission of the premixed and ground chocolate ingredients, and an outlet at the other end connected to the inlet end of the second chamber, there being disposed within the first chamber a pair of parallel and longitudinally extending rotatable shafts on which are mounted a plurality of helical paddles arranged to work upon the mixture within the first chamber and to progress it from said one end to said other end, the second chamber also incorporating a longitudinally extending shaft provided with helical paddles for progressing mixture within the second chamber from the inlet end to an outlet at the opposite end thereof, a relatively high-speed continuous mixing machine for receiving the mixture from said chambers, means for feeding lecithin and/or cocoa butter to the mixture entering said machine, and means for returning a proportion of the mixture leaving said machine to the first mentioned chamber.

2. Means as claimed in claim 1 in which the pair of shafts in the first chamber are arranged to rotate in opposite directions and the paddles on the two shafts are not all of similar helix angle so as to impart a tumbling and cutting action to the mixture in the chamber.

3. Means for manufacturing chocolate comprising in combination a first chamber having an inlet at one end for the admission of premixed ground chocolate ingredients, a pair of parallel and longitudinally extending shafts rotatable in opposite directions in the first chamber, a plurality of helically extending paddles carried by both of said shafts respectively, said paddles not having constant helix angles but being arranged to traverse the mixture from the inlet end of the first chamber to an outlet at the opposite end, a second chamber disposed below said first chamber, said second chamber having an inlet at one end connected to the outlet of the first chamber, a rotatable shaft carrying helical paddles extending longitudinally in the second chamber, to feed material from the inlet end of the second chamber to an outlet at the opposite end, and a third chamber disposed below the second chamber having an inlet at one end connected to the outlet of the second chamber, a pair of parallel and longitudinally extending shafts in the third chamber, a plurality of helically disposed paddles on one of the pair of shafts in the third chamber for traversing material therein from the inlet end of the chamber to an outlet at the opposite end, a plurality of radial arms on the other of said pair of shafts in the third chamber arranged to cut the chocolate mixture from the paddles on said one of the pair of shafts in the third chamber, a mixing vessel for receiving the mixture from the third chamber, means for feeding lecithin and/or cocoa butter into the mixture leaving the third chamber and means for feeding a proportion of the material leaving the mixing vessel to the inlet of the first chamber.

* * * * *